US012689113B2

(12) United States Patent
Li et al.

(10) Patent No.: US 12,689,113 B2
(45) Date of Patent: Jul. 21, 2026

(54) TERMINAL ANTENNA SYSTEM AND ELECTRONIC DEVICE

(71) Applicant: HONOR DEVICE CO., LTD., Shenzhen (CN)

(72) Inventors: Shaobo Li, Shenzhen (CN); Yiwu Hu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 334 days.

(21) Appl. No.: 18/266,959

(22) PCT Filed: Sep. 7, 2022

(86) PCT No.: PCT/CN2022/117659
§ 371 (c)(1),
(2) Date: Jun. 13, 2023

(87) PCT Pub. No.: WO2023/082812
PCT Pub. Date: May 19, 2023

(65) Prior Publication Data
US 2023/0420827 A1 Dec. 28, 2023

(30) Foreign Application Priority Data
Nov. 12, 2021 (CN) ......................... 202111340312.3

(51) Int. Cl.
*H01Q 5/20* (2015.01)
*H01Q 1/24* (2006.01)
(Continued)

(52) U.S. Cl.
CPC ............. *H01Q 1/243* (2013.01); *H01Q 1/521* (2013.01)

(58) Field of Classification Search
CPC ............ H01Q 1/48; H01Q 1/243; H01Q 5/20; H01Q 5/371; H01Q 5/378; H01Q 9/42;
(Continued)

(56) References Cited

U.S. PATENT DOCUMENTS 10,290,922 B2 5/2019 Li et al.
10,403,971 B2 * 9/2019 Yu ............................ H01Q 1/48
(Continued)

FOREIGN PATENT DOCUMENTS

CN 102655273 A 9/2012
CN 104934706 A 9/2015
(Continued)

OTHER PUBLICATIONS

Best et al., "A Tutorial on the Receiving and Scattering Properties of Antennas", IEEE Antennas and Propagation Magazine, vol. 51 , No. 5, Oct. 2009 (Year: 2009).*

*Primary Examiner* — Dimary S Lopez Cruz
*Assistant Examiner* — Marin Stoytchev Stoytchev
(74) *Attorney, Agent, or Firm* — WOMBLE BOND DICKINSON (US) LLP

(57) ABSTRACT

Embodiments of this application relate to the field of antenna technologies, and disclose a terminal antenna system and an electronic device, to effectively reduce mutual impact between adjacent antennas. A specific solution is as follows: The terminal antenna system includes: a first radiator and a second radiator, where a first end of the first radiator is coupled to a first end of the second radiator through a gap. A first feed point is provided at a second end, away from the second radiator, of the first radiator, and a first ground point is further provided on the first radiator. A second feed point is provided at a second end of the second radiator, and the second end of the second radiator is an end away from the first radiator.

19 Claims, 12 Drawing Sheets

(51) Int. Cl.
*H01Q 1/52* (2006.01)
*H01Q 5/314* (2015.01)
*H01Q 5/371* (2015.01)

(58) Field of Classification Search
CPC .......... H01Q 5/50; H01Q 5/307; H01Q 5/321; H01Q 5/364
See application file for complete search history.

(56) References Cited

U.S. PATENT DOCUMENTS

| | | | | |
|---|---|---|---|---|
| 2004/0212545 | A1* | 10/2004 | Li | H01Q 9/42 343/866 |
| 2005/0001769 | A1 | 1/2005 | Qi et al. | |
| 2015/0145744 | A1 | 5/2015 | Kao et al. | |
| 2018/0248264 | A1* | 8/2018 | Chen | H01Q 9/40 |
| 2022/0209403 | A1 | 6/2022 | Li et al. | |
| 2023/0335922 | A1 | 10/2023 | Wang et al. | |

FOREIGN PATENT DOCUMENTS

| | | | |
|---|---|---|---|
| CN | 110247160 | A | 9/2019 |
| CN | 110676574 | A | 1/2020 |
| CN | 111628298 | A | 9/2020 |
| CN | 112736432 | A | 4/2021 |
| CN | 112928456 | A | 6/2021 |
| CN | 114243259 | A | 3/2022 |
| WO | 2016103859 | A1 | 6/2016 |

* cited by examiner (a)

(b)

(a)

(b)

(c)

TERMINAL ANTENNA SYSTEM AND ELECTRONIC DEVICE

CROSS-REFERENCE TO RELATED APPLICATIONS

This application is a national stage of International Application No. PCT/CN2022/117659 filed on Sep. 7, 2022, which claims priority to Chinese Patent Application No. 202111340312.3 filed on Nov. 12, 2021. The disclosures of both of the aforementioned application are hereby incorporated by reference in their entireties.

TECHNICAL FIELD

This application relates to the field of antenna technologies, and in particular, to a terminal antenna system and an electronic device.

BACKGROUND

With development of electronic devices, the number of antennas in an electronic device is increasing. In addition, space for disposing antennas in an electronic device becomes increasingly limited. This inevitably leads to adjacent disposing of antennas.

The adjacent disposing of antennas may cause mutual impact between antennas, resulting in degradation of antenna performance.

SUMMARY

Embodiments of this application provide a terminal antenna system and an electronic device, to effectively reduce mutual impact between adjacent antennas through a shared ground point design. In addition, a new mode can be further excited through a distributed capacitor design, to increase bandwidth of a single-frequency antenna. In addition, hardware costs can be reduced. Therefore, a wireless communication function of an electronic device can be better supported.

To achieve the foregoing objective, the following technical solutions are used in the embodiments of this application:

According to a first aspect, a terminal antenna system is provided. The terminal antenna system is disposed in an electronic device, and the terminal antenna system includes: a first radiator and a second radiator, where a first end of the first radiator is coupled to a first end of the second radiator through a gap. A first feed point is provided at a second end, away from the second radiator, of the first radiator, and a first ground point is further provided on the first radiator. A second feed point is provided at a second end of the second radiator, and the second end of the second radiator is an end away from the first radiator.

Based on this solution, a terminal antenna system solution with a co-body antenna design is provided. In this example, two adjacent antennas are a left-handed antenna for implementing a GPS antenna and an IFA antenna covering N41 and N78 frequency bands. A ground point at an end of the left-handed antenna and a ground point of the IFA antenna may be a same ground point, namely, the first ground point in this solution. In addition, effects of a distributed capacitor are achieved through the gap, so that a a common mode (CM) and a differential mode (DM) can be used to replace an original radiation mode on the IFA antenna to achieve better radiation effects. In addition, effects of a distributed capacitor are achieved through the gap, and a radiator corresponding to one electrode of the distributed capacitor can further expand a radiator area of the GPS antenna. In addition, a new mode is excited to extend left-handed and increase coverage bandwidth of the GPS antenna, to reduce a requirement for uniformity in mass production.

In a possible design, the first radiator includes a first portion and a second portion, the first portion and the second portion are connected in an L shape, the gap is provided between the second portion and the second radiator, and the first ground point is provided on the first portion. Based on this solution, a specific distribution form of the first radiator on the electronic device is provided. In this example, the first radiator may be divided into the first portion and the second portion based on arrangement in different directions on the electronic device. For example, the first portion may be disposed at a top edge, and the second portion may be disposed at a side edge.

In a possible design, a first distance (Y2) is set to be within a range of 2 mm to 4 mm, and the first distance (Y2) is a distance between the first portion of the first radiator and a reference ground. A first length (Y3) is set to be within a range of 5 mm to 15 mm, and the first length (Y3) is a length of the second portion of the first radiator. A width (X2) of the gap is set to be within a range of 0.2 mm to 1.2 mm. Based on this solution, ranges of three key sizes in this solution are limited. For example, a distance between a radiator of the left-handed antenna disposed at the top and the reference ground is Y2, and Y2 is set to be within the foregoing range, so that an equilibrium mode can be well excited to increase left-handed resonance bandwidth. A length Y3 of a radiator that is disposed at a side edge and that is connected to the left-handed antenna may be set to be within the foregoing range, to implement tuning of resonance at the N41 frequency band. A width X2 of a gap provided at a side edge may be set to be within the foregoing range, to implement tuning of resonance at the N41 and N78 frequency bands.

In a possible design, the terminal antenna system includes a first antenna and a second antenna, and a radiator of the first antenna is the first radiator. A radiator of the second antenna includes: the second radiator, the second portion of the first radiator, and a portion of the first radiator between the second portion and the first ground point on the first radiator. Based on this solution, specific logical division of the antenna system is provided. For example, the antenna system may be divided into two antennas for respectively implementing GPS coverage and NR frequency band coverage.

In a possible design, a capacitor is further disposed between the first feed point and the first radiator, and the capacitor is configured to excite a left-handed mode of the first antenna. Based on this solution, a possible example of implementing a radiation mechanism of the first antenna is provided. For example, series capacitors may be used to excite a left-handed mode on the first antenna.

In a possible design, when the terminal antenna system operates, the first antenna covers a first frequency band, the second antenna covers a second frequency band and a third frequency band, and a resonance position of the second frequency band is lower than that of the first frequency band. Based on this solution, an operating status of the terminal antenna system is described. For example, the first antenna may be configured to cover a frequency band, for example, a GPS frequency band. For another example, the second antenna may be configured to cover two frequency bands, for example, N41 and N78.

In a possible design, the width X2 of the gap is used for adjusting resonance positions of the second frequency band and the third frequency band. The first length Y3 is used for adjusting the resonance position of the second frequency band. Based on this solution, an example for adjusting the resonance positions corresponding to the first frequency band and the second frequency band is provided. For example, X2 and/or Y3 may be adjusted to accurately adjust the resonance positions.

In a possible design, a mode in which the first antenna covers the first frequency band includes the left-handed mode and an equilibrium mode, and the first distance Y2 is used for adjusting a resonance position of the equilibrium mode. Based on this solution, a mechanism of increasing bandwidth by the first antenna is described. For example, when the first antenna is a GPS antenna, the first antenna provided in this embodiment of this application can excite the left-handed mode to cover the GPS frequency band, and can also increase bandwidth of the left-handed mode through the equilibrium mode. In some implementations, the equilibrium mode can be excited and adjusted through adjustment of Y2.

In a possible design, the first frequency band includes the GPS frequency band, the second frequency band includes 2.5 GHz to 2.7 GHZ, and the third frequency band includes 3.3 GHz to 3.8 GHz. Based on this solution, frequency bands covered by the antenna system are limited. For example, the first frequency band may include the GPS frequency band, and the GPS frequency band includes 1575 MHz and/or positioning frequency bands required by positioning systems such as BeiDou and/or Galileo. The second frequency band and the third frequency band may include the N41 frequency band and the N78 frequency band respectively.

In a possible design, the terminal antenna system is disposed at a corner of the electronic device, where the first portion of the first radiator is disposed at the top or bottom of the electronic device, and the second portion of the first radiator and the second radiator are disposed on a side of the electronic device; or the first portion of the first radiator is disposed on a side of the electronic device, and the second portion of the first radiator and the second radiator are disposed at the top or bottom of the electronic device. Based on this solution, a position for disposing the terminal antenna system is provided. The terminal antenna system may be disposed at a corner of the electronic device (for example, a mobile phone), to obtain a good radiation environment.

According to a second aspect, an electronic device is provided. The electronic device is provided with the terminal antenna system according to any one of the first aspect or the possible designs of the first aspect. When the electronic device transmits or receives a signal, the signal is transmitted or received through the terminal antenna system.

It should be understood that technical features of the technical solution provided in the second aspect can all correspond to the terminal antenna system provided in the first aspect and the possible designs of the first aspect, and therefore similar beneficial effects can be achieved. Details are not described herein again.

DESCRIPTION OF EMBODIMENTS

With development of wireless communication, the number of antennas in an electronic device is increasing. For example, the electronic device is a mobile phone. To support wireless communication on a 5G frequency band, a 5G antenna needs to be added to the mobile phone in addition to an existing antenna. The existing antenna may include a GPS antenna for positioning.

Figure 1:
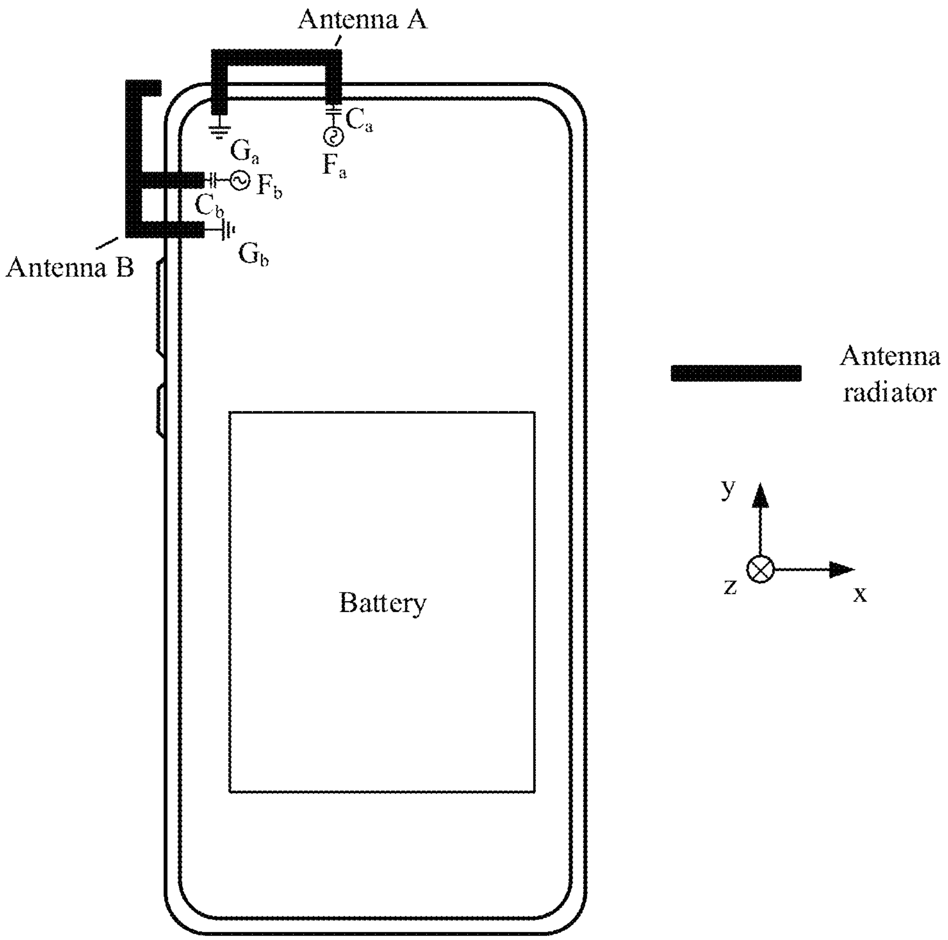
FIG. 1 is a schematic diagram of positions of two adjacent antennas disposed in a mobile phone.

For example, FIG. 1 shows a GPS antenna and a 5G antenna for covering N41 and N78 of a 5G frequency band in a mobile phone. N41 can correspond to operating frequency bands of 2.5 GHz to 2.7 GHz. N78 can correspond to operating frequency bands of 3.3 GHz to 3.8 GHz.

In the example shown in FIG. 1, an antenna A may be the GPS antenna, and an antenna B may be the 5G antenna for covering N41 and N78.

The antenna A may be a left-handed antenna. For example, the antenna A may include a radiator, one end of the radiator may be connected to a feed point $F_a$ through a capacitor $C_a$, and the other end of the radiator may be grounded through $G_a$. In some implementations, the grounded end of the radiator may be an end near a corner of the mobile phone, so that a floor feature mode can be better excited to improve radiation efficiency of a left-handed mode. For a structure of the left-handed antenna, refer to CN201380008276.8 and CN201410109571.9. Details are not described herein again.

Figure 2:
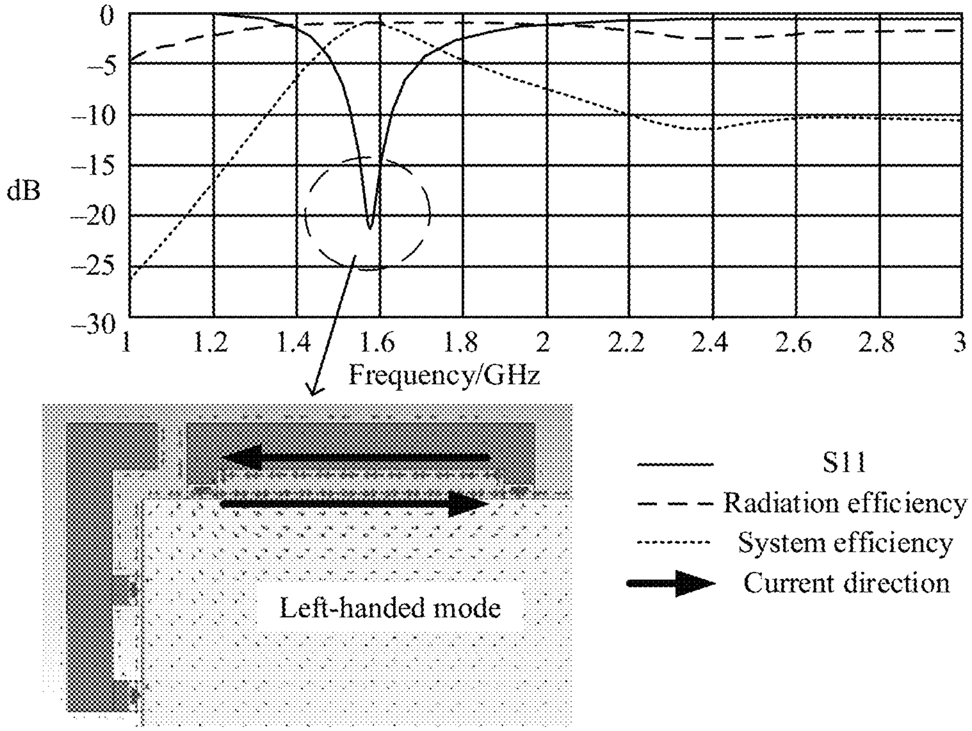
FIG. 2 is a schematic diagram of simulation of an antenna at a position shown in FIG. 1.

For example, FIG. 2 shows simulation of currents and corresponding S-parameters during operating of the antenna A. It can be learned that a unidirectional (for example, leftward) current can be formed on the radiator through excitation of $F_a$, to implement radiation in the left –handed mode. It can be learned from the S-parameters that a deepest point of S11 has exceeded −20 dB, and corresponding radiation efficiency and system efficiency are also higher than −5 dB.

The antenna B may be an IFA antenna. For example, the antenna B may include a radiator, and one end of the radiator may be suspended. A feed point $F_b$ may be provided on the radiator. A capacitor $C_b$ may be disposed between the feed point $F_b$ and the radiator to excite the left-handed mode. The other end different from the suspended end may be grounded through $G_b$. In some implementations, the suspended end of the radiator may be an end near a corner of the mobile phone, so that end space of the IFA antenna is more open, to achieve higher radiation performance.

Figure 3:
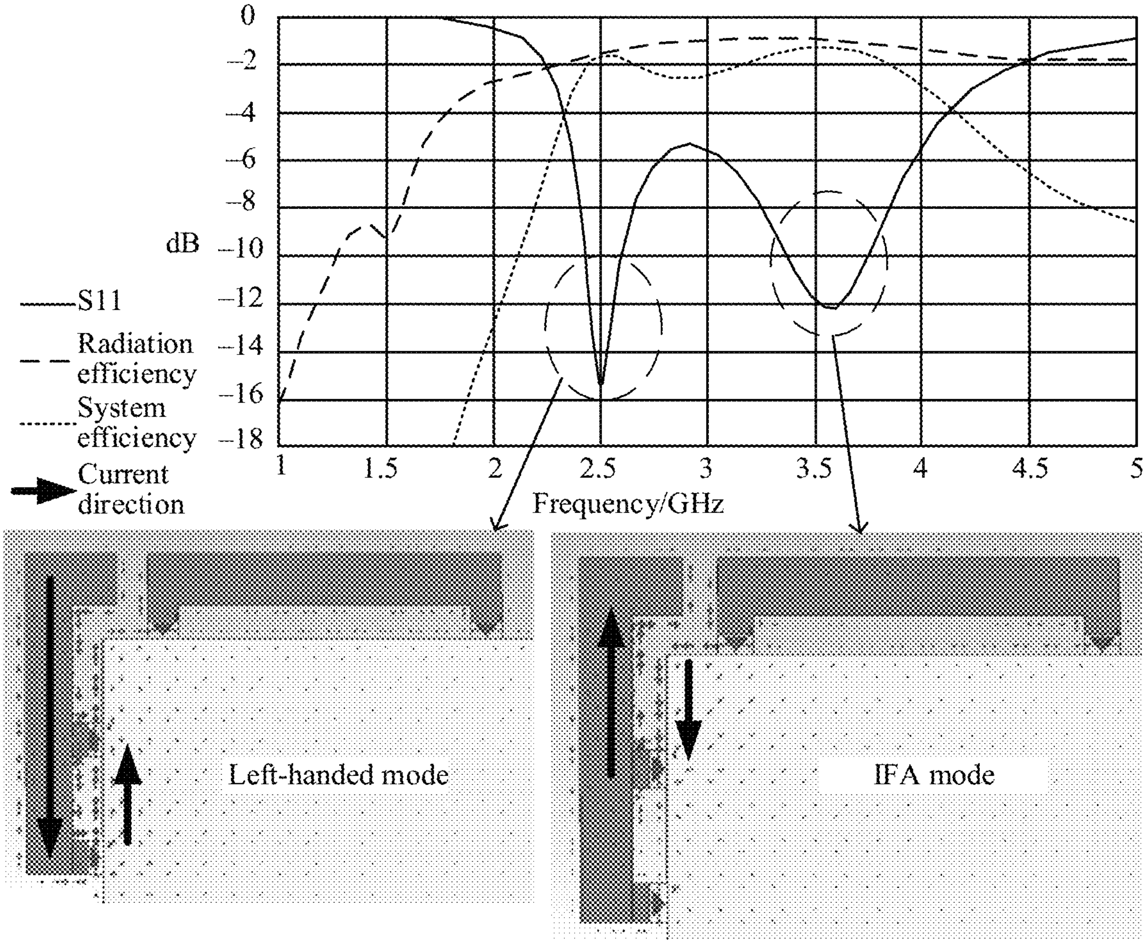
FIG. 3 is a schematic diagram of simulation of another antenna at a position shown in FIG. 1.

For example, FIG. 3 shows simulation of currents and corresponding S-parameters during operation of the antenna B. It can be learned that the left-handed mode can be excited on the radiator between the feed point and a ground point through excitation of $F_b$, to cover the N41 frequency band, and radiation efficiency and system efficiency in the mode both exceed −4 dB. In addition, an IFA mode (for example, a ¼-wavelength IFA mode) can be further excited on the radiator through excitation of $F_b$. The IFA mode may be used for covering the N78 frequency band, and radiation efficiency and system efficiency in the mode both exceed −2 dB.

Based on the foregoing descriptions, an operating frequency band of N41 covers a bandwidth of 200 MHz, and an operating frequency band of N78 covers a bandwidth of 500 MHz. With reference to the simulation results shown in FIG. 3, although higher performance is achieved at a deepest point on two resonance frequencies generated during operation of the antenna B, bandwidth is insufficient. During coverage of N41 and N78, performance at an edge of a frequency band is significantly degraded compared with performance at a center of the frequency band.

With reference to the antenna arrangement shown in FIG. 1, it can be learned that an open end of the radiator of the antenna B is disposed at a corner of the mobile phone but is close to a ground point of the antenna A. For the IFA antenna, an open end of the IFA antenna is a large electric field point, and existence of a ground point near the large electric field point significantly affects headroom of the IFA antenna, affecting radiation performance of the IFA antenna. This causes the insufficient bandwidth of the antenna B in the foregoing simulation results.

Figure 4:
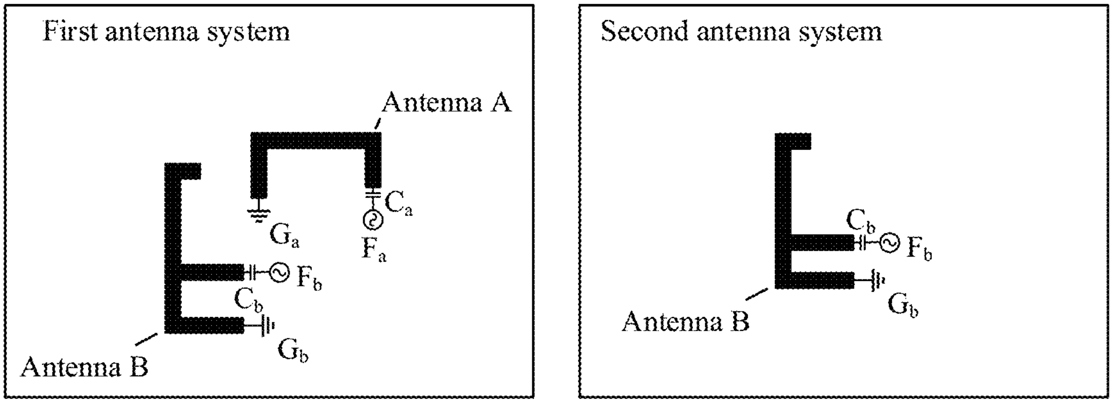
FIG. 4 is a schematic diagram of comparison between two antenna systems.

To further describe how performance of the antenna B is affected by the antenna A, operating statuses of two antenna systems shown in FIG. 4 are used for comparison and description. A first antenna system shown in FIG. 4*a* is an antenna system including an antenna A and an antenna B with the composition shown in FIG. 1. A second antenna system shown in (b) in FIG. 4*b* is an antenna system in which the antenna A is removed and only the antenna B is retained.

Figure 5:
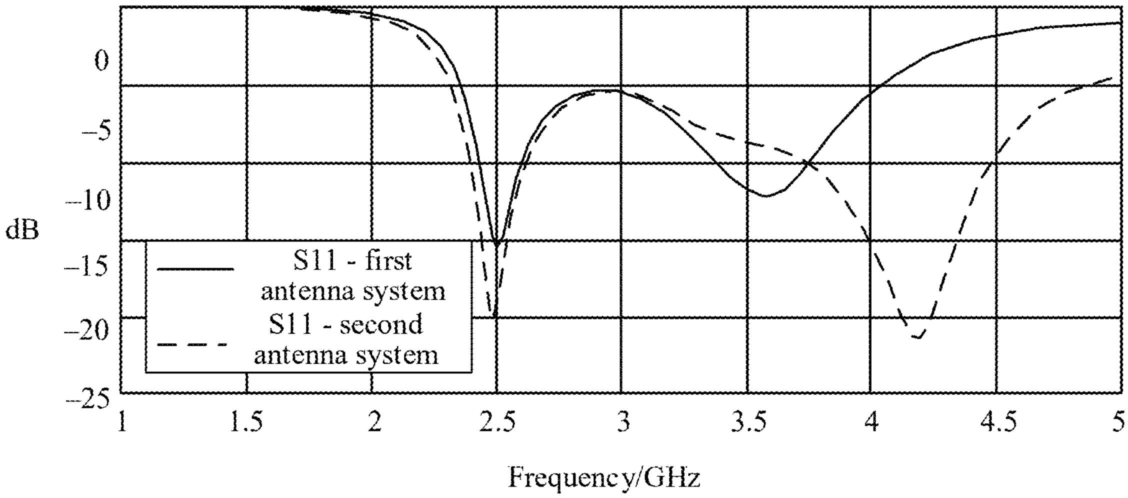
FIG. 5 is a schematic diagram of comparison between simulation of S-parameters of the two antenna systems shown in FIG. 4.

FIG. 5 shows simulation of S11 of the two antenna systems shown in FIG. 4. It can be learned that, compared with the first antenna system, S11 of the second antenna system in which the antenna A (namely, a GPS antenna) is removed is significantly improved on both the N41 and N78 frequency bands. For example, on the N41 frequency band, bandwidth of S11 increases, and a deepest point becomes deeper. It can be understood that, because the N41 frequency band is mainly covered in the left-handed mode and entire antenna headroom is improved, radiation performance is directly improved without a resonance frequency offset. For another example, on the N78 frequency band, bandwidth of S11 increases, and a deepest point becomes deeper. It can be understood that, because the N78 frequency band is mainly covered in the IFA mode and entire antenna headroom is improved, resonance changes greatly. With the increase in the bandwidth and the depth of S11, a significant frequency offset occurs due to a change of a floor arrangement near an end of the large electric field point. Therefore, the antenna A causes significant impact to the antenna B.

Due to a large number of antennas and limited space on the mobile phone, it is common that an end of the antenna B is close to the ground point of the antenna A among adjacent antennas. This significantly limits radiation performance of the antenna B, affecting communication performance on N41 and N78.

It should be understood that, in the foregoing example, an example in which the antenna A is a GPS antenna and the antenna B is an NR antenna (for example, a 5G antenna) for covering N41 and N78 is used for description. When two antennas cover other frequency bands, similar problems also occur if an end of one antenna is close to a ground point of the other antenna.

To resolve the foregoing problems, the embodiments of this application provide an antenna solution. A shared ground point is used, and a structure of an NR antenna is improved, so that a frequency band corresponding to the NR antenna is covered by a new mode. This can significantly reduce impact of a ground point of an adjacent antenna on performance of the NR antenna. In addition, due to a structural arrangement of the NR antenna, a new mode can be further excited to cover an operating frequency band of the adjacent antenna, to increase a bandwidth of the antenna and improve radiation performance.

The following describes the solution provided in the embodiments of this application still by using an example in which the NR antenna covers N41 and N78 and the adjacent antenna is a GPS antenna.

It should be noted that the antenna solution provided in the embodiments of this application may be applied to an electronic device of a user, to support a wireless communication function of the electronic device. For example, the electronic device may be a portable mobile device such as a mobile phone, a tablet computer, a personal digital assistant (personal digital assistant, PDA), an augmented reality (augmented reality, AR)/virtual reality (virtual reality, VR) device, and a media player, or the electronic device may be a wearable electronic device such as a smartwatch. A specific form of the device is not particularly limited in the embodiments of this application.

An environment in which the antenna solution provided in the embodiments of this application is disposed is first described below by using an example in which the electronic device is a mobile phone. In the embodiments of this application, a structural implementation of the antenna solution may be referred to as an antenna system or a terminal antenna system.

Figure 6:
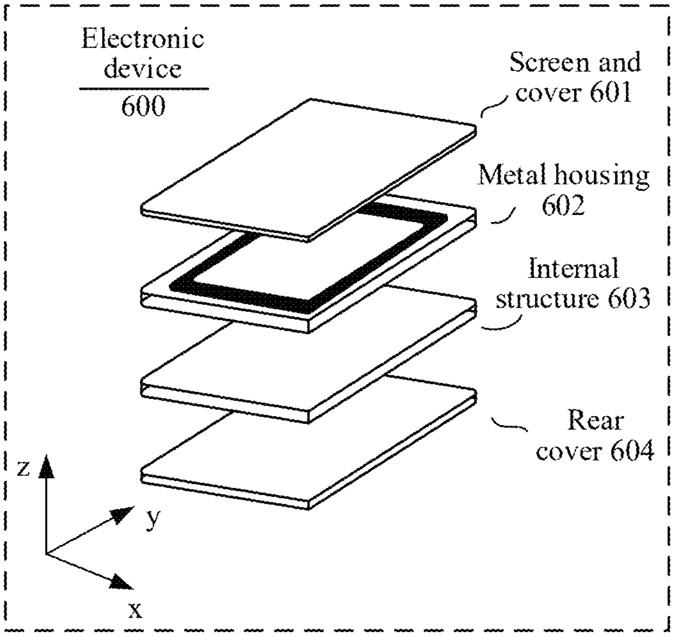
FIG. 6 is a schematic diagram of a composition of an electronic device according to an embodiment of this application.

For example, FIG. 6 is a schematic structural diagram of an electronic device 600 according to an embodiment of this application. As shown in FIG. 6, in the electronic device 600 provided in this embodiment of this application, a screen and cover 601, a metal housing 602, an internal structure 603, and a rear cover 604 may be disposed in sequence from top to bottom along a z-axis.

The screen and cover 601 may be configured to implement a display function of the electronic device 600. The metal housing 602 may serve as a main frame of the electronic device 600 to provide rigid support for the electronic device 600. The internal structure 603 may include a collection of electronic components and mechanical components that implement various functions of the electronic device 600. For example, the internal structure 603 may include a shielding can, a screw, and a reinforcing rib. The rear cover 604 may be a rear appearance side of the electronic device 600, and the rear cover 604 may be made of a glass material, a ceramic material, plastics, and the like in different implementations.

The antenna solution provided in the embodiments of this application may be applied to the electronic device 600 shown in FIG. 6, to support a wireless communication function of the electronic device 600. In some embodiments, an antenna included in the antenna solution may be disposed on the metal housing 602 of the electronic device 600. In some other embodiments, an antenna included in the antenna solution may be disposed on the rear cover 604 of the electronic device 600, or the like.

A specific implementation of the antenna may vary in different implementations of the embodiments of this application. For example, in some embodiments, the antenna may be implemented in combination with a metal bezel on the metal housing 602 shown in FIG. 6. In some other embodiments, the antenna solution may alternatively be implemented by using a flexible printed circuit (Flexible Printed Circuit, FPC), metalframe diecasting for anodicoxidation (Metalframe Diecasting for Anodicoxidation, MDA), or the like. Alternatively, the antenna solution may be obtained by combining at least two of the foregoing implementations. A specific implementation form of a magnetic flux loop monopole antenna is not limited in this embodiment of this application.

For example, the antenna is implemented by using an FPC. The FPC may include a non-conductive substrate, and a conductive layer may be provided on the substrate. For example, the conductive layer may be made of metal or another conductive material. In some implementations, the metal may be copper, silver, or the like. A radiator of an antenna system is obtained through structural adjustment of the conductive layer.

Figure 7:
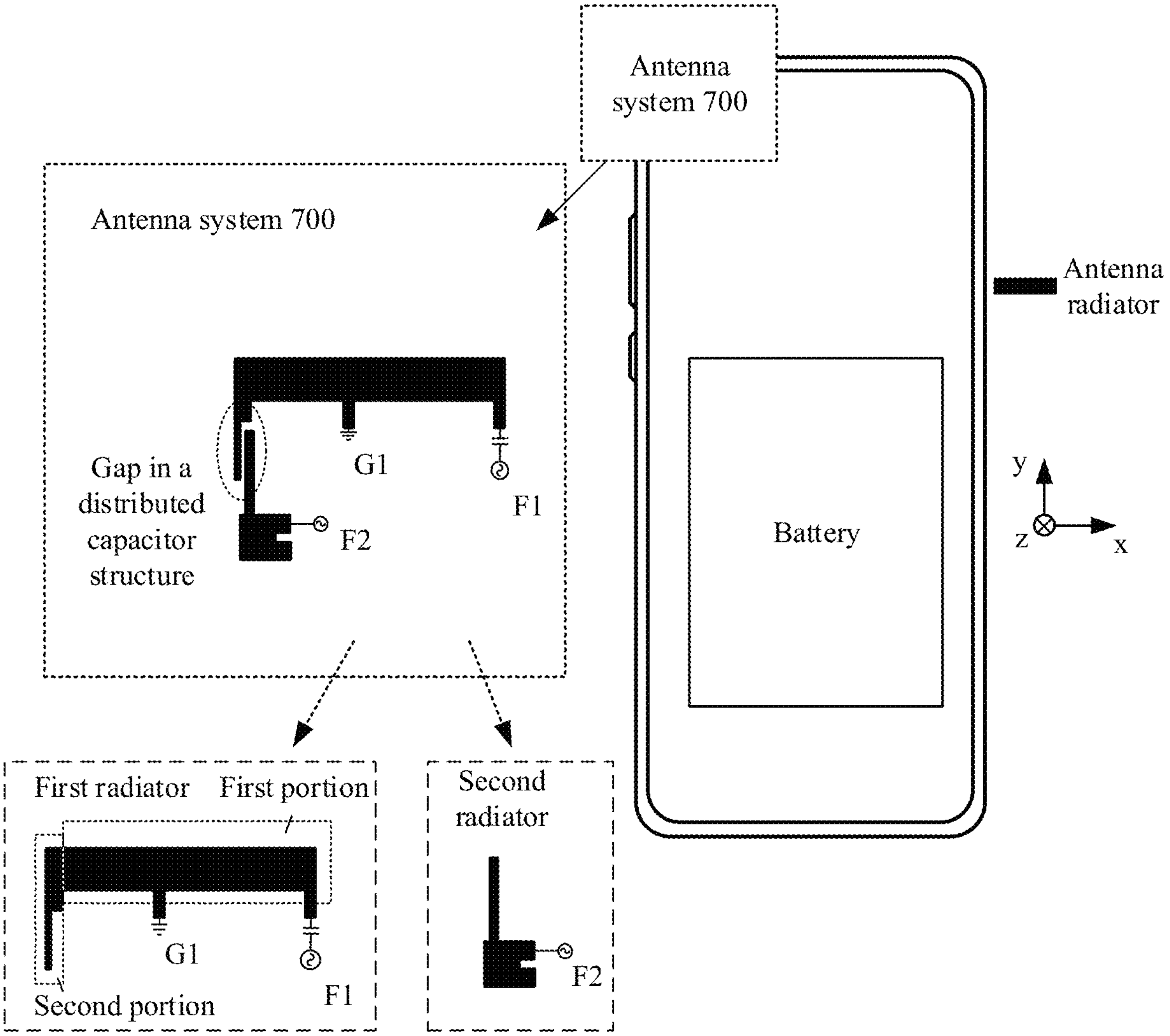
FIG. 7 is a schematic structural diagram of an antenna solution according to an embodiment of this application.

For example, FIG. 7 shows an antenna system 700 according to an embodiment of this application. In different examples, the antenna system 700 may be disposed at a corner of an electronic device (for example, a mobile phone), for example, an upper left corner, a lower left corner, an upper right corner, or a lower right corner of a rear view.

In this example, the antenna system 700 is disposed in the upper left corner of the rear view of the mobile phone.

As shown in FIG. 7, a radiator of the antenna system 700 may include a first radiator and a second radiator. The first radiator and the second radiator may be coupled through a gap in a distributed capacitor structure.

The first radiator may be divided into a first portion and a second portion based on arrangement at different edges of the electronic device. For example, the first portion may be a part of the radiator disposed at a top edge of the mobile phone. The second portion may be a part of the first radiator disposed at a side edge of the mobile phone.

In this example, in two ends of the first radiator, an end near the second radiator may be referred to as a first end of the first radiator. Similarly, in two ends of the second radiator, an end near the first radiator may be referred to as a first end of the second radiator. Correspondingly, in the two ends of the first radiator, an end away from the second radiator may be referred to as a second end of the first radiator. Similarly, in the two ends of the second radiator, an end away from the first radiator may be referred to as a second end of the second radiator.

On the first portion of the first radiator, a feed point F1 may be provided at a right end (for example, the second end) of the first portion. A ground point G1 (for example, referred to as a first ground point) may be further provided on the first portion. In some implementations, the feed point F2 may be connected to the radiator through a capacitor, to excite a left-handed mode to cover a GPS frequency band.

The second radiator may be a part of the radiator that is disposed at a side edge of the mobile phone and that is not connected to the first radiator. A feed point F2 may be provided at an end of the second radiator (for example, the second end of the second radiator). As shown in FIG. 7, a gap between the second radiator and the first portion of the first radiator may be in a distributed capacitor structure. For example, the distributed capacitor structure may be implemented by using an S-shaped through gap or a Z-shaped through gap.

It should be noted that a structure of the antenna system 700 shown in FIG. 7 is only an example and does not constitute a limitation on a shape or a size of the antenna. The antenna system 700 may alternatively have other variable shapes in different examples.

For example, structural characteristics of the antenna solution provided in the embodiments of this application are described with reference to size marking shown in FIG. 8. For example, when the antenna system 700 is configured to cover the GPS frequency band and the N41 and N78 frequency bands, various structural sizes of the antenna system 700 may be included in the following ranges:

On the first radiator, an X-direction length X3 may be set to be within a range of 30 mm reduced by 20% to 30 mm increased by 20%. A Y-direction width Y1 may be set to be within a range of 5 mm reduced by 20% to 5 mm increased by 20%. A distance Y2 (which may be also referred to as a first distance) between the first portion of the first radiator and a reference ground may be set to be within a range of 2 mm to 4 mm. When Y2 is set to be within the foregoing range, an equilibrium mode can be better excited to increase GPS resonance bandwidth. When the second portion of the first radiator is disposed at a side edge of the mobile phone, a length Y3 (which may also be referred to as a first length) of the second portion may be set to be within a range of 5 mm to 15 mm. A specific size of Y3 may be adjusted to adjust a resonance position of N41.

On the second radiator, a Y-direction length Y4 from an end of the radiator to a top edge of the reference ground may be set to be within a range of 14 mm reduced by 20% to 14 mm increased by 20%. An X-direction width of the radiator may be set to be within a range of 5 mm reduced by 20% to 5 mm increased by 20%.

A width X2 of a gap between the first radiator and the second radiator may be set to be within a range of 0.2 mm to 1.2 mm. A specific size of X2 may be adjusted within the foregoing range to finely adjust resonance positions of N41 and N78.

Figure 8:
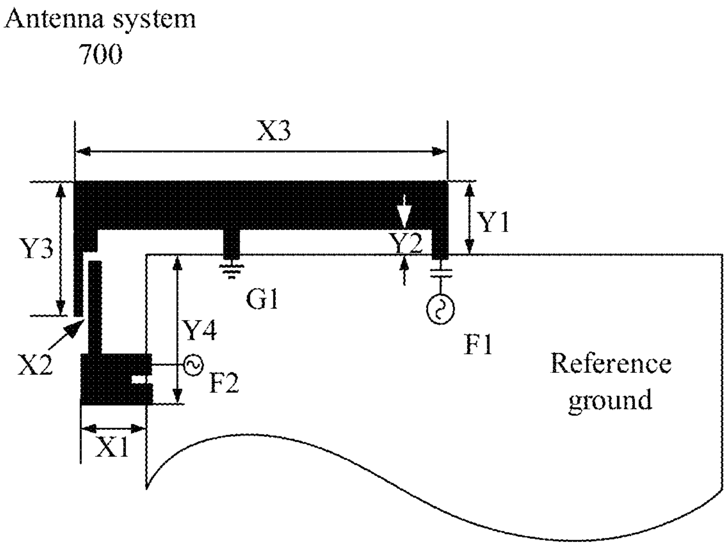
FIG. 8 is a schematic diagram of size marking of an antenna solution according to an embodiment of this application.

During operating of the antenna system 700 with the structural arrangement shown in FIG. 8, a GPS signal may be fed through F1, and corresponding N41 and N78 signals may be fed through F2. In this way, the antenna system 700 can transmit and receive wireless signals on corresponding frequency bands through radiation covering the GPS frequency band and the N41 and N78 frequency bands.

An operating mechanism and effects of the antenna system provided in the embodiments of this application are described below with reference to specific examples.

With reference to the foregoing descriptions, the antenna system provided in this embodiment of this application may include two sub-antennas disposed in a co-body mode. For example, the antenna system may include a first antenna for covering the GPS frequency band, and a second antenna for covering the N41 and N78 frequency bands.

Figure 9:
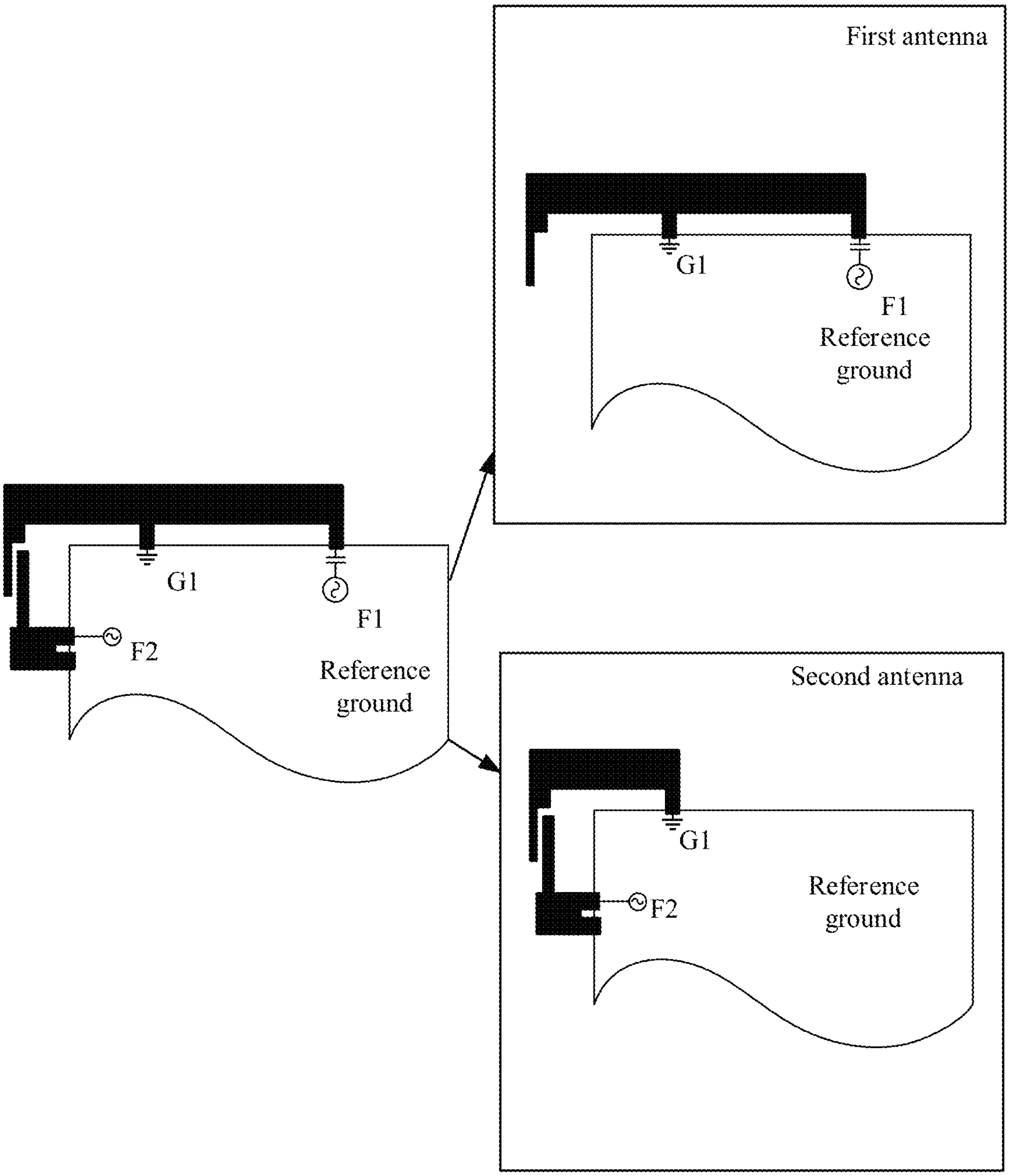
FIG. 9 is a schematic diagram of division an antenna solution according to an embodiment of this application.

For example, refer to FIG. 9. A radiator of the first antenna may include the first radiator. The first antenna may be configured to transmit and receive GPS signals.

A radiator of the second antenna may include the second radiator of the antenna system, and a portion of the first radiator between a first ground point G1 and the second radiator. That is, the radiator of the second antenna may include the second radiator, the second portion of the first radiator, and a sub-portion of the first portion of the first radiator between the ground point and an end near the second radiator. The second antenna may be configured to transmit and receive corresponding N41 and N78 signals.

It can be learned that the ground point G1 is shared by the first antenna and the second antenna. Compared with a conventional antenna solution (for example, the antenna solution shown in FIG. 1), the ground point is shared, so that space occupied for providing a plurality of ground points can be saved, and hardware costs corresponding to one ground point can be reduced.

It should be noted that the division of the first antenna and the second antenna shown in FIG. 9 is only logical division. For the first antenna, due to existence of the distributed capacitor structure, during operating of the first antenna, energy is coupled to the other side of the distributed capacitor through the distributed capacitor structure. Therefore, a weak current also exists on a radiator of the antenna system other than the radiator included in the first antenna obtained through division in FIG. 9. That is, in other division, the radiator of the first antenna may further include a part other than the radiator of the first antenna shown in FIG. 9. Because a current of a GPS signal on the another part is weak, contribution to transmission and reception of GPS signals is also weak. Similarly, the radiator of the second antenna may further include a part other than the radiator of the second antenna shown in FIG. 9. Because a current of a signal on the another part is weak, contribution to transmission and reception of corresponding N41 and N78 signals is also weak.

An antenna system with the composition shown in any one of FIG. 7 to FIG. 9 can provide higher radiation performance with a same antenna area. For example, higher bandwidth coverage and higher radiation efficiency and system efficiency are provided for GPS, N41, and N78.

For example, effects that can be achieved by the antenna solution provided in the embodiments of this application are described below with reference to simulation of S-parameters and efficiency and comparison with a conventional antenna.

Figure 10:
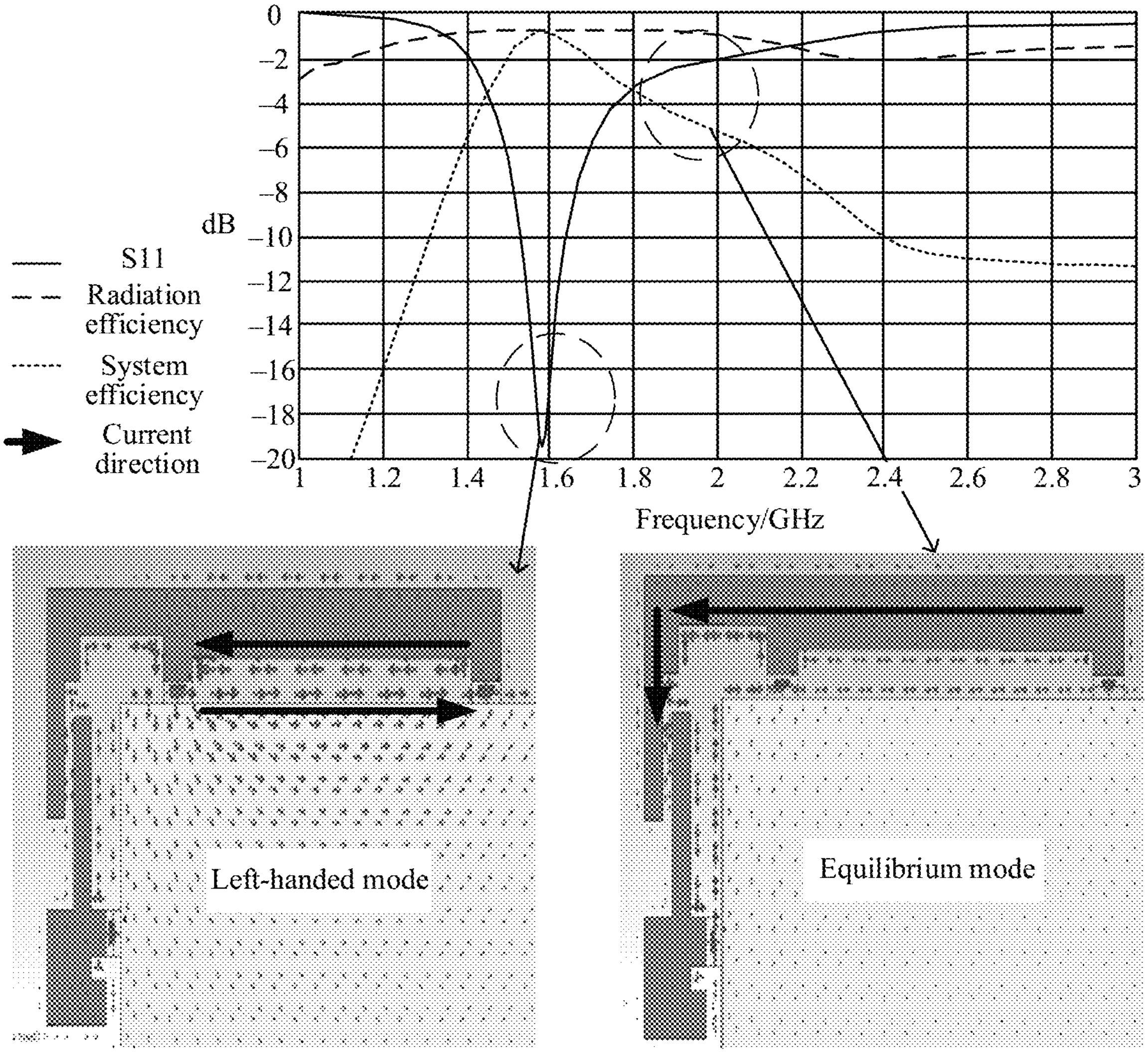
FIG. 10 is a schematic diagram of simulation of S-parameters and currents of an antenna solution according to an embodiment of this application.

FIG. 10 shows simulation of currents and corresponding S-parameters during operating of the first antenna (namely, the GPS antenna). As shown in FIG. 10, during operating of the first antenna, currents in a same direction can be excited on the radiator between the feed point and the ground point, that is, a left-handed mode is excited. Correspondingly, in S11, a deepest point of resonance in the left-handed mode is close to −20 dB, and bandwidth at −6 dB exceeds 300 MHz. In addition, the first antenna may further excite an equilibrium mode, and resonance corresponding to the equilibrium mode may be near 2 GHz in the simulation of the S-parameters in FIG. 10. Although S11 in the equilibrium mode is not significant, resonance efficiency and bandwidth in the left-handed mode can be increased. For example, in an efficiency simulation curve shown in FIG. 10, system efficiency near 2 GHz is close to −4 dB. Although the GPS antenna usually requires low bandwidth, the increase of the efficiency and bandwidth can effectively avoid dramatic performance fluctuations caused by slight non-uniformity in mass production.

Figure 11:
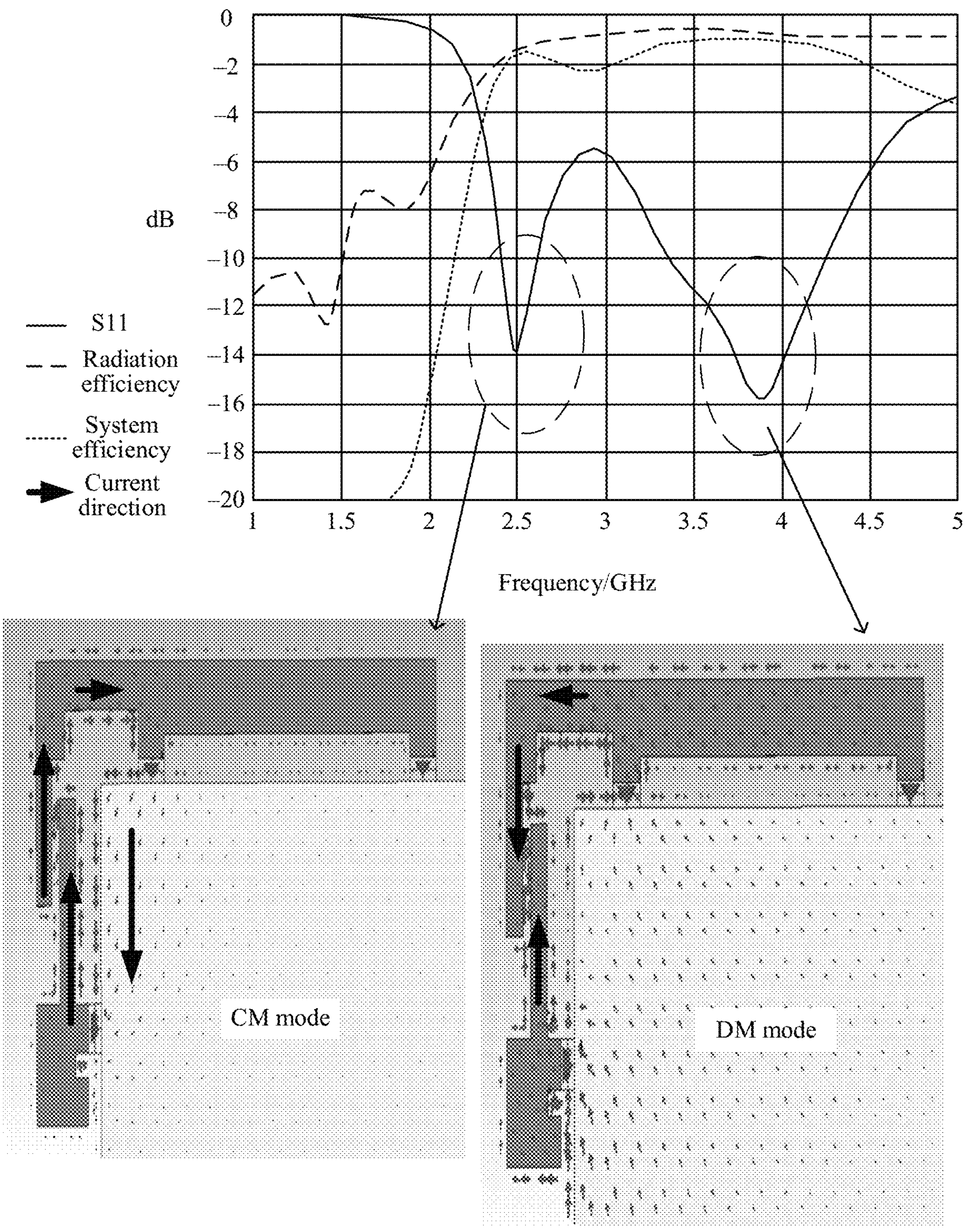
FIG. 11 is a schematic diagram of simulation of S-parameters and currents of an antenna solution according to an embodiment of this application.

FIG. 11 shows simulation of currents and corresponding S-parameters during operating of the second antenna (namely, the NR antenna). As shown in FIG. 11, during operating of the second antenna, a common mode (CM) and a differential mode (DM) can be separately excited. When currents in a same direction are distributed on the radiator of the second antenna, the CM mode may be used. When currents in opposite direction are distributed on the radiator of the second antenna by using the distributed capacitor structure as a boundary, the DM mode may be used. In this way, the N41 frequency band is covered by resonance of the CM mode, and the N78 frequency band is covered by resonance of the DM mode. It can be learned from an efficiency simulation curve that both radiation efficiency and system efficiency exceed −2 dB.

FIG. 10 and FIG. 11 separately show current distribution and radiation statuses of the antenna solution provided in the embodiments of this application. The following describes effects that can be achieved by the solution provided in the embodiments of this application through comparison with the conventional antenna shown in FIG. 1.

Figure 12:
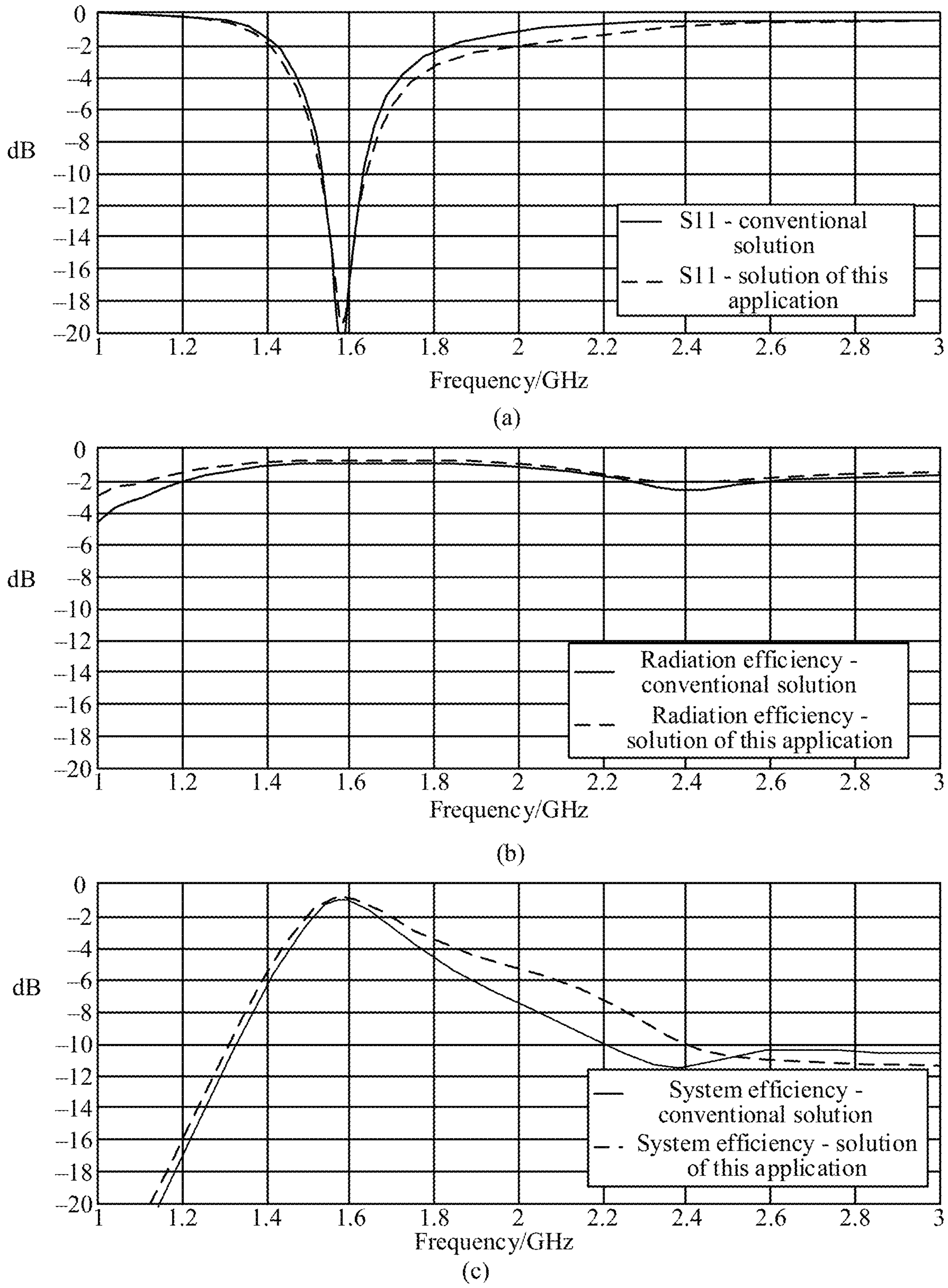
FIG. 12 is a schematic diagram of comparison between S-parameters of an antenna solution and a conventional solution according to an embodiment of this application.

For example, FIG. 12 shows performance comparison between the antenna solution provided in the embodiments of this application and a conventional antenna solution on a GPS frequency band. FIG. 12*a* shows comparison of S11. It can be learned that resonance bandwidth of S11 in the solution of this application is significantly superior to that of the conventional solution due to introduction of the equilibrium mode. FIG. 12*b* shows comparison of radiation efficiency, and FIG. 12*c* shows comparison of system efficiency. It can be learned that, corresponding to S11, in the solution provided in the embodiments of this application, radiation efficiency on a frequency band (for example, near 2 GHZ) corresponding to the equilibrium mode is improved, and improvement of the system efficiency is more significant. For example, the system efficiency is improved by more than 2 dB near 2 GHz.

Figure 13:
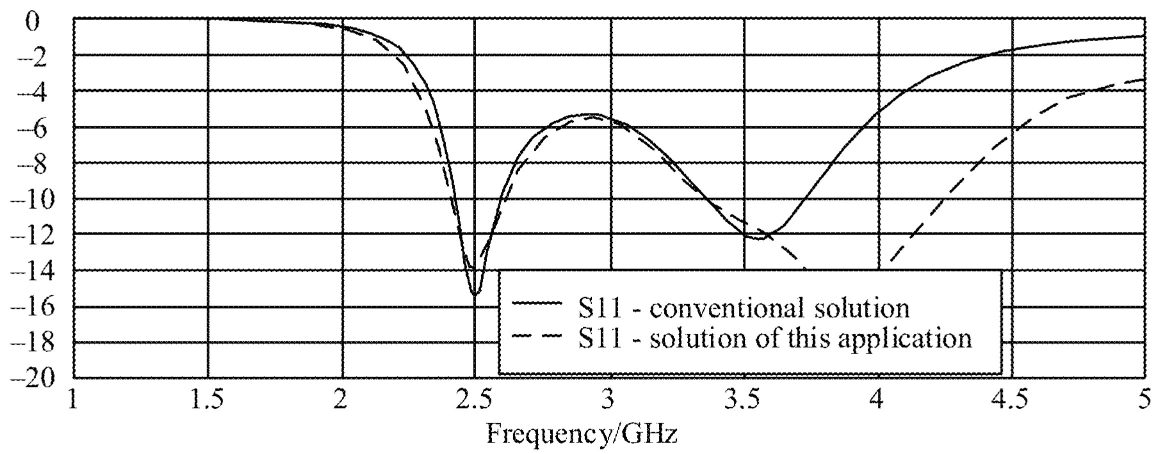
FIG. 13 is a schematic diagram of comparison between S-parameters of an antenna solution and a conventional solution according to an embodiment of this application.
Figure 13:
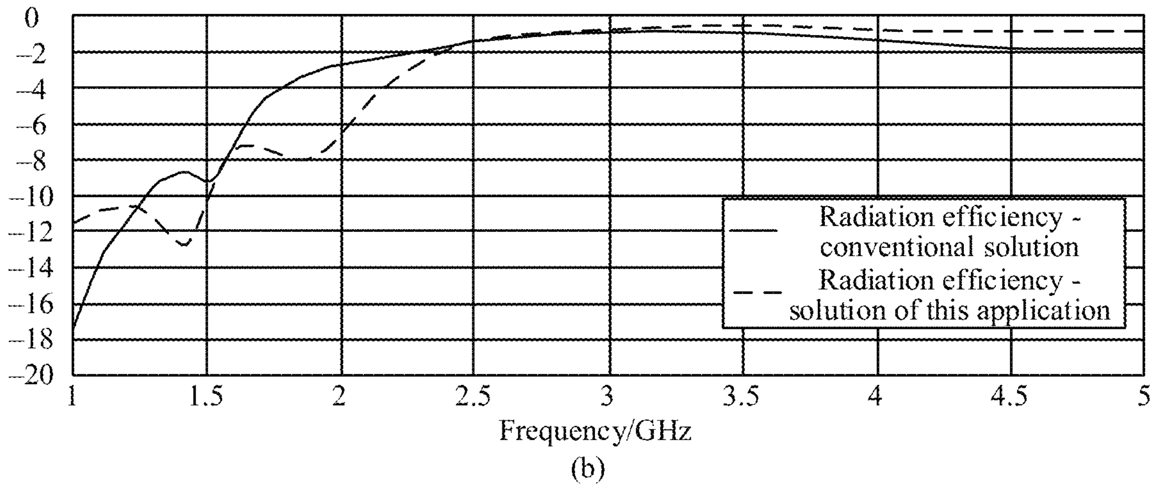
Figure 13:
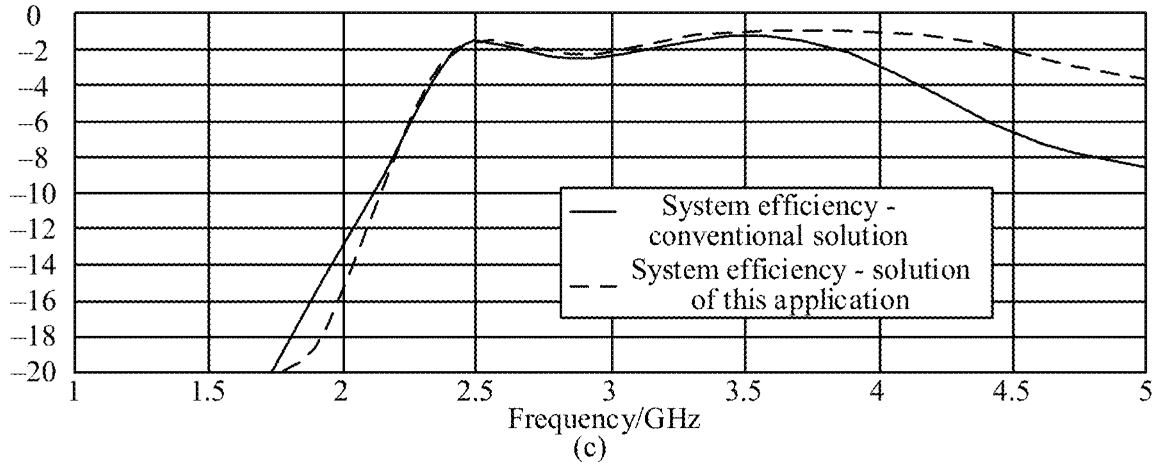

FIG. 13 shows performance comparison between the antenna solution provided in the embodiments of this application and a conventional antenna solution on an NR frequency band (for example, N41 and N78). FIG. 13*a* shows comparison of S11. It can be learned that resonance bandwidth of S11 in the solution of this application is significantly superior to that of the conventional solution. FIG. 13*b* shows comparison of radiation efficiency, and FIG. 13*c* shows comparison of system efficiency. It can be learned that, corresponding to S11, in the solution provided in the embodiments of this application, N41 and N78 are covered in the CM mode and the DM mode, so that radiation efficiency is improved, and improvement of the system efficiency is more significant. For example, the system efficiency is improved by more than 2 dB near 4 GHz.

Through comparison between FIG. 12 and FIG. 13, it can be learned that performance of the antenna system provided in the embodiments of this application is significantly higher than that of the conventional solution (for example, the solution shown in FIG. 1).

With reference to the foregoing descriptions, in the conventional solution, performance of the NR antenna is degraded due to impact of the ground point of the GPS antenna. Correspondingly, in the antenna solution provided in the embodiments of this application, the co-body solution with a shared ground point is used. This can increase an area of the radiator while avoiding performance degradation caused by a ground point of an adjacent antenna (for example, the GPS antenna) being close to an end of the NR antenna.

Figure 14:
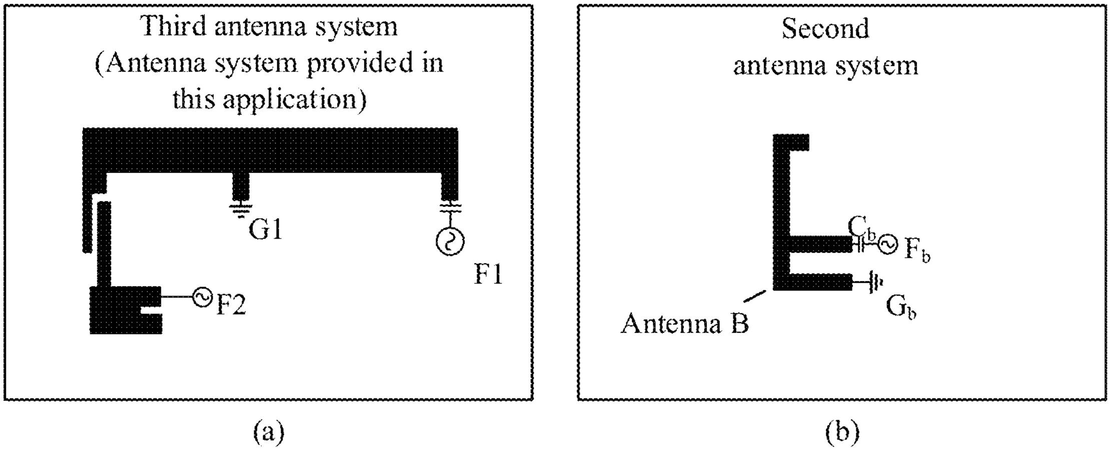
FIG. 14 is a schematic diagram of comparison between antenna systems according to an embodiment of this application.

For example, FIG. 14 shows performance comparison between an antenna system provided in the embodiments of this application (that is, a third antenna system shown in FIG. 14*a* and an antenna system including an NR antenna (for example, an IFA antenna) without a GPS antenna (that is, a second antenna system shown in FIG. 14*b*, to testify the foregoing effects.

Figure 15:
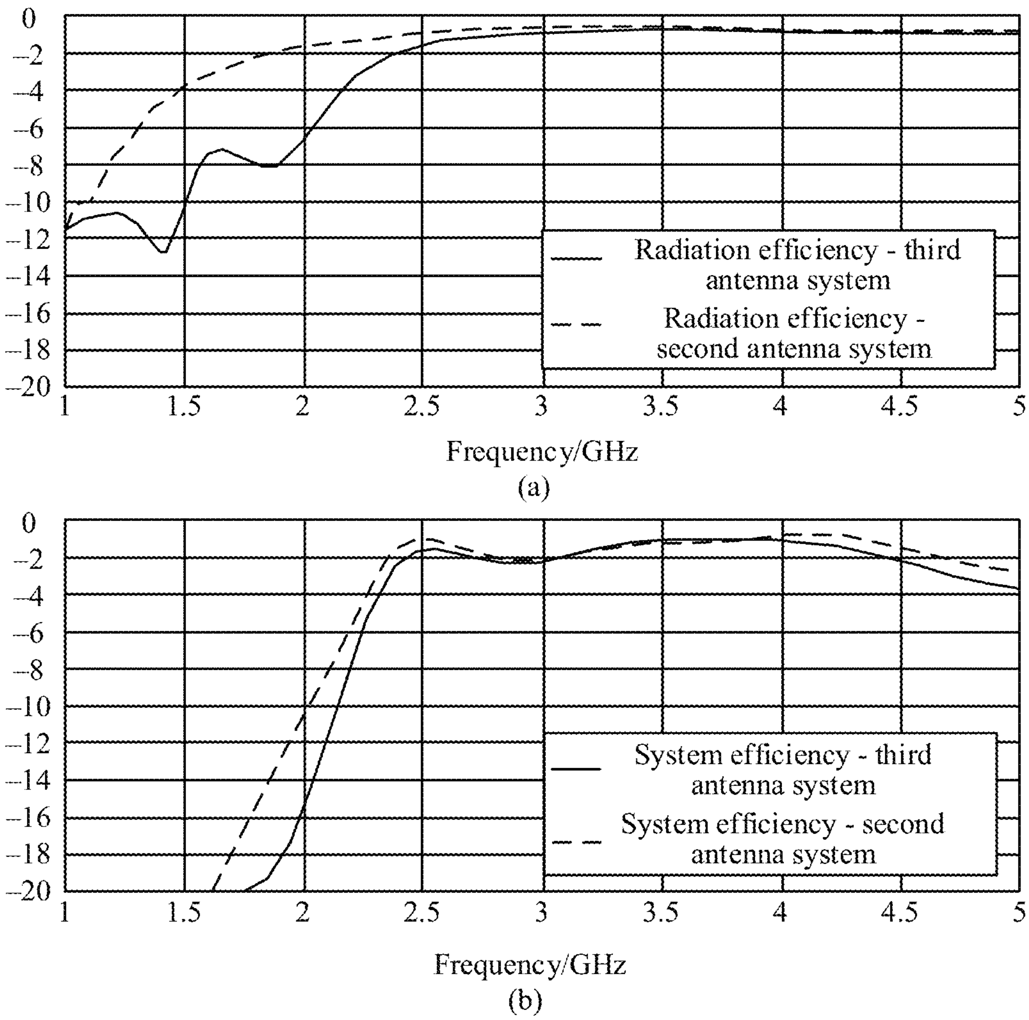
FIG. 15 is a schematic diagram of simulation of S-parameters of two antenna systems with the composition shown in FIG. 14 according to an embodiment of this application.

FIG. 15 shows comparison between efficiency simulation of the two antenna systems shown in FIG. 14 on the N41 and N78 frequency bands. It can be learned that, in terms of either radiation efficiency or system efficiency, performance of the antenna solution provided in the embodiments of this application is basically the same as that of the NR antenna including only the IFA antenna without GPS interference. Therefore, the antenna solution provided in the embodiments of this application can effectively avoid influence of the GPS antenna on performance of the NR antenna.

Although this application is described with reference to specific features and the embodiments thereof, apparently, various modifications and combinations may be made to them without departing from the spirit and scope of this application. Correspondingly, this specification and the accompanying drawings are merely used as exemplary descriptions of this application defined by the appended claims, and are considered as having covered any of and all of modifications, variations, combinations, or equivalents within the scope of this application. Obviously, a person skilled in the art can make various modifications and variations to this application without departing from the spirit and scope of this application. In this case, if the modifications and variations made to this application fall within the scope of the claims of this application and their equivalent technologies, this application is intended to include these modifications and variations.

What is claimed is:

1. A terminal antenna system, wherein the terminal antenna system is coupled to a housing or a cover of an electronic device, the terminal antenna system comprising:

a first radiator and a second radiator, wherein a first end of the first radiator is coupled to a first end of the second radiator through a gap, the first radiator comprises a first portion and a second portion, the first portion and the second portion are connected in an L shape, and the gap is located between the second portion and the second radiator;

a first feed point, located at a second end of the first radiator, away from the second radiator, wherein a first ground point is located on the first portion of the first radiator, and the first ground point is electrically coupled to a reference ground;

a second feed point, located at a second end of the second radiator, and the second end of the second radiator is located away from the first radiator;

a first antenna comprising the first radiator;

a second antenna comprising: the second radiator, the second portion of the first radiator, and a portion of the first radiator between the second portion and the first ground point on the first radiator; and a capacitor, disposed between the first feed point and the first radiator, the capacitor being coupled to the first radiator to configure the first antenna to operate in a left-handed mode, wherein the left-handed mode is a resonance mode in which a unidirectional current is formed on the first radiator from the first feed point toward the first ground point, wherein when the terminal antenna system operates, the first antenna covers a first frequency band, the second antenna covers a second frequency band and a third frequency band, and a resonance position of the second frequency band is higher than that of the first frequency band, the first antenna operates in the left-handed mode and an equilibrium mode to cover the first frequency band, the equilibrium mode being a resonance mode that expands a usable bandwidth of the first antenna in combination with the left-handed mode, and a distance between the first portion of the first radiator and the reference ground determines a resonance position of the equilibrium mode.

2. The terminal antenna system according to claim 1, wherein the housing is a metal housing.

3. The terminal antenna system according to claim 2, wherein the distance between the first portion of the first radiator and the reference ground is within a range of 2 mm to 4 mm;

a length of the second portion of the first radiator is within a range of 5 mm to 15 mm; and a width of the gap is within a range of 0.2 mm to 1.2 mm.

4. The terminal antenna system according to claim 2, wherein the first radiator and the second radiator are formed on a flexible printed circuit.

5. The terminal antenna system according to claim 4, wherein the first end of the second radiator is suspended and the second end of the second radiator is grounded.

6. The terminal antenna system according to claim 1, wherein the cover is a rear cover or the electronic device.

7. The terminal antenna system according to claim 3, wherein the width of the gap determines resonance positions of the second frequency band and the third frequency band; and the length of the second portion of the first radiator determines the resonance position of the second frequency band.

8. The terminal antenna system according to claim 6, wherein the terminal antenna system is disposed at a corner of the electronic device, and the first portion of the first radiator is disposed on a side of the electronic device, and the second portion of the first radiator and the second radiator are disposed at a top or a bottom of the electronic device.

9. The terminal antenna system according to claim 6, wherein the first frequency band comprises a GPS frequency band, the second frequency band comprises 2.5 GHz to 2.7 GHZ, and the third frequency band comprises 3.3 GHz to 3.8 GHz.

10. The terminal antenna system according to claim 1, wherein the terminal antenna system is disposed at a corner of the electronic device, and the first portion of the first radiator is disposed at a top or a bottom of the electronic device, and a second portion of the first radiator and the second radiator are disposed on a side of the electronic device.

11. A terminal antenna system, wherein the terminal antenna system is disposed in an electronic device, and the terminal antenna system comprises:

a first radiator and a second radiator, wherein a first end of the first radiator is coupled to a first end of the second radiator through a gap, the first radiator comprises a first portion and a second portion, the first portion and the second portion are connected in an L shape, and the gap is located between the second portion and the second radiator;

a first feed point, located at a second end of the first radiator, away from the second radiator, wherein a first ground point is located on the first portion of the first radiator, and the first ground point is electrically coupled to a reference ground;

a second feed point, located at a second end of the second radiator, and the second end of the second radiator is located away from the first radiator;

a first antenna comprising the first radiator;

a second antenna comprising: the second radiator, the second portion of the first radiator, and a portion of the first radiator between the second portion and the first ground point on the first radiator; and a capacitor which is disposed between the first feed point and the first radiator, the capacitor being coupled to the first radiator to configure the first antenna to operate in a left-handed mode, wherein the left-handed mode is a resonance mode in which a unidirectional current is formed on the first radiator from the first feed point toward the first ground point, wherein when the terminal antenna system operates, the first antenna covers a first frequency band, the second antenna covers a second frequency band and a third frequency band, and a resonance position of the second frequency band is higher than that of the first frequency band, the first antenna operates in the left-handed mode and an equilibrium mode to cover the first frequency band, the equilibrium mode being a resonance mode that expands a usable bandwidth of the first antenna in combination with the left-handed mode, and a distance between the first portion of the first radiator and the reference ground determines a resonance position of the equilibrium mode.

12. The terminal antenna system according to claim 11, wherein the first radiator and the second radiator are formed on a flexible printed circuit.

13. The terminal antenna system according to claim 11, wherein the distance between the first portion of the first radiator and the reference ground is within a range of 2 mm to 4 mm;

a length of the second portion of the first radiator is within a range of 5 mm to 15 mm; and a width of the gap is within a range of 0.2 mm to 1.2 mm.

14. The terminal antenna system according to claim 11, wherein the first end of the second radiator is suspended and the second end of the second radiator is grounded.

15. The terminal antenna system according to claim 13, wherein the width of the gap determines resonance positions of the second frequency band and the third frequency band;

the length of the second portion of the first radiator determines the resonance position of the second frequency band.

16. The terminal antenna system according to claim 11, wherein the terminal antenna system is disposed at a corner of the electronic device, wherein the first portion of the first radiator is disposed on a side of the electronic device, and the second portion of the first radiator and the second radiator are disposed at a top or a bottom of the electronic device.

17. The terminal antenna system according to claim 11, wherein the first frequency band comprises a GPS frequency band, the second frequency band comprises 2.5 GHz to 2.7 GHZ, and the third frequency band comprises 3.3 GHz to 3.8 GHz.

18. The terminal antenna system according to claim 11, wherein the terminal antenna system is disposed at a corner of the electronic device, wherein the first portion of the first radiator is disposed at a top or a bottom of the electronic device, and the second portion of the first radiator and the second radiator are disposed on a side of the electronic device.

19. An electronic device, comprising a terminal antenna system and when the electronic device transmits or receives a signal, the signal is transmitted or received through the terminal antenna system, the terminal antenna system comprising:

a first radiator and a second radiator, wherein a first end of the first radiator is coupled to a first end of the second radiator through a gap, the first radiator comprises a first portion and a second portion, the first portion and the second portion are connected in an L shape, and the gap is located between the second portion and the second radiator;

a first feed point, located at a second end of the first radiator, away from the second radiator, wherein a first ground point is located on the first portion of the first radiator, and the first ground point is electrically coupled to a reference ground;

a second feed point, located at a second end of the second radiator, and the second end of the second radiator is located away from the first radiator;

a first antenna comprising the first radiator;

a second antenna comprising: the second radiator, the second portion of the first radiator, and a portion of the first radiator between the second portion and the first ground point on the first radiator; and a capacitor, disposed between the first feed point and the first radiator, the capacitor being coupled to the first radiator to configure the first antenna to operate in a left-handed mode, wherein the left-handed mode is a resonance mode in which a unidirectional current is formed on the first radiator from the first feed point toward the first ground point, wherein when the terminal antenna system operates, the first antenna covers a first frequency band, the second antenna covers a second frequency band and a third frequency band, and a resonance position of the second frequency band is higher than that of the first frequency band, the first antenna operates in the left-handed mode and an equilibrium mode to cover the first frequency band, the equilibrium mode being a resonance mode that expands a usable bandwidth of the first antenna in combination with the left-handed mode, and a distance between the first portion of the first radiator and the reference ground determines a resonance position of the equilibrium mode.

* * * * *